No. 786,615. PATENTED APR. 4, 1905.
B. YORE.
BAKER'S OVEN.
APPLICATION FILED SEPT. 2, 1904.

5 SHEETS—SHEET 1.

Witnesses
Inventor
Baptiste Yore
By his Attorneys

No. 786,615. PATENTED APR. 4, 1905.
B. YCRE.
BAKER'S OVEN.
APPLICATION FILED SEPT. 2, 1904.

5 SHEETS—SHEET 2.

Witnesses
Wm J. Bergman
Henry J. Schicker.

Inventor
Baptiste Ycre
By his Attorneys
Greuer Niles

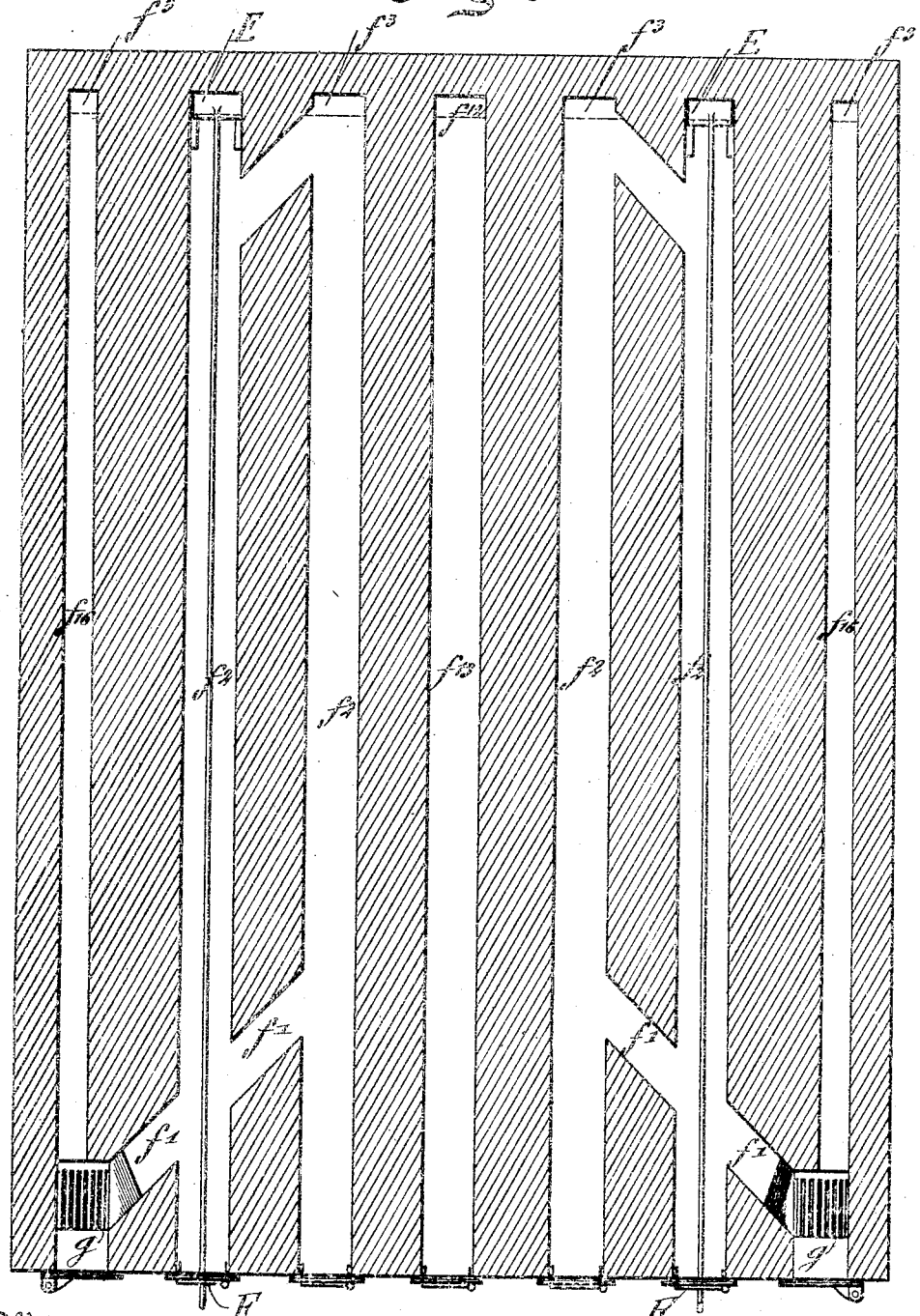

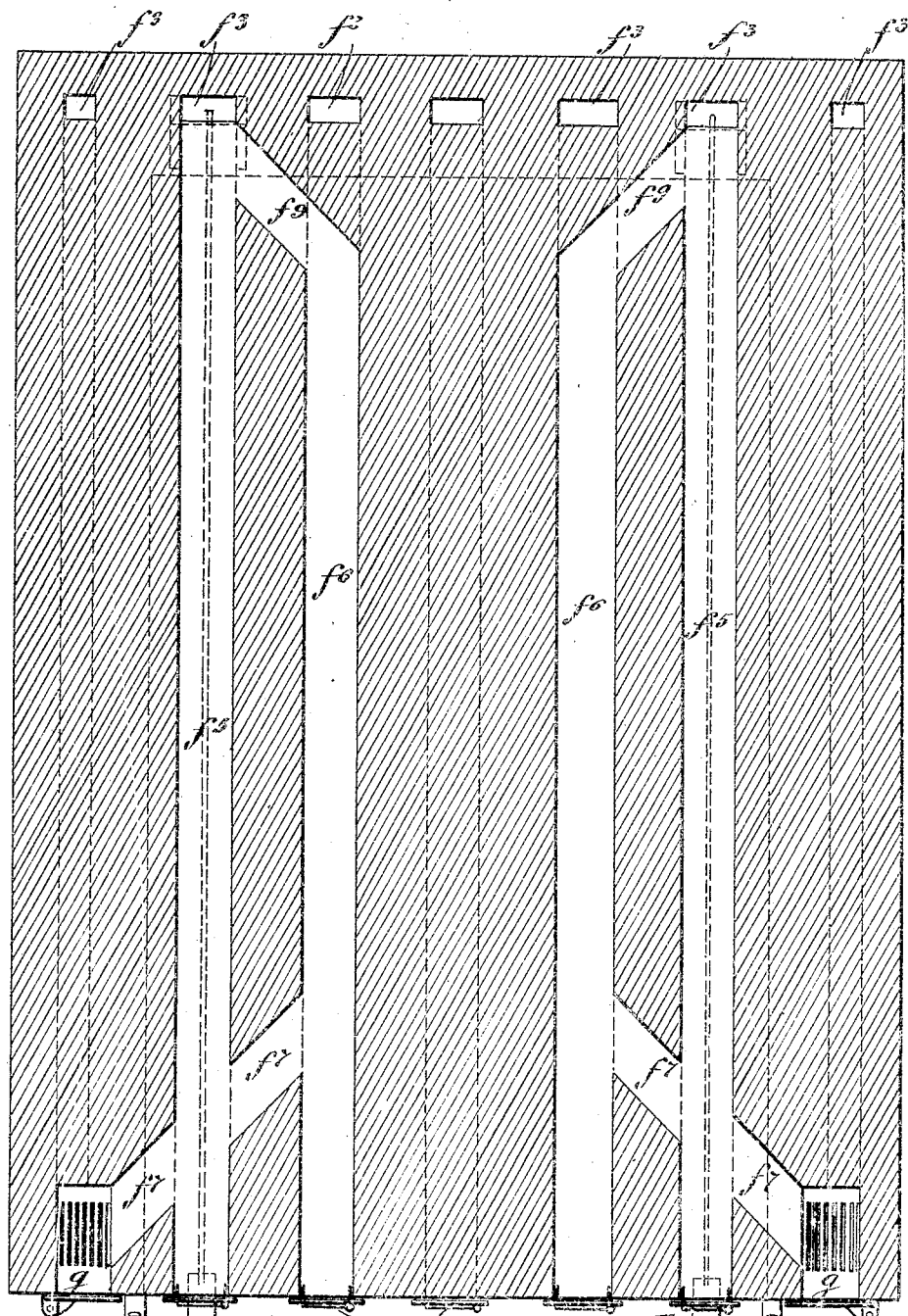

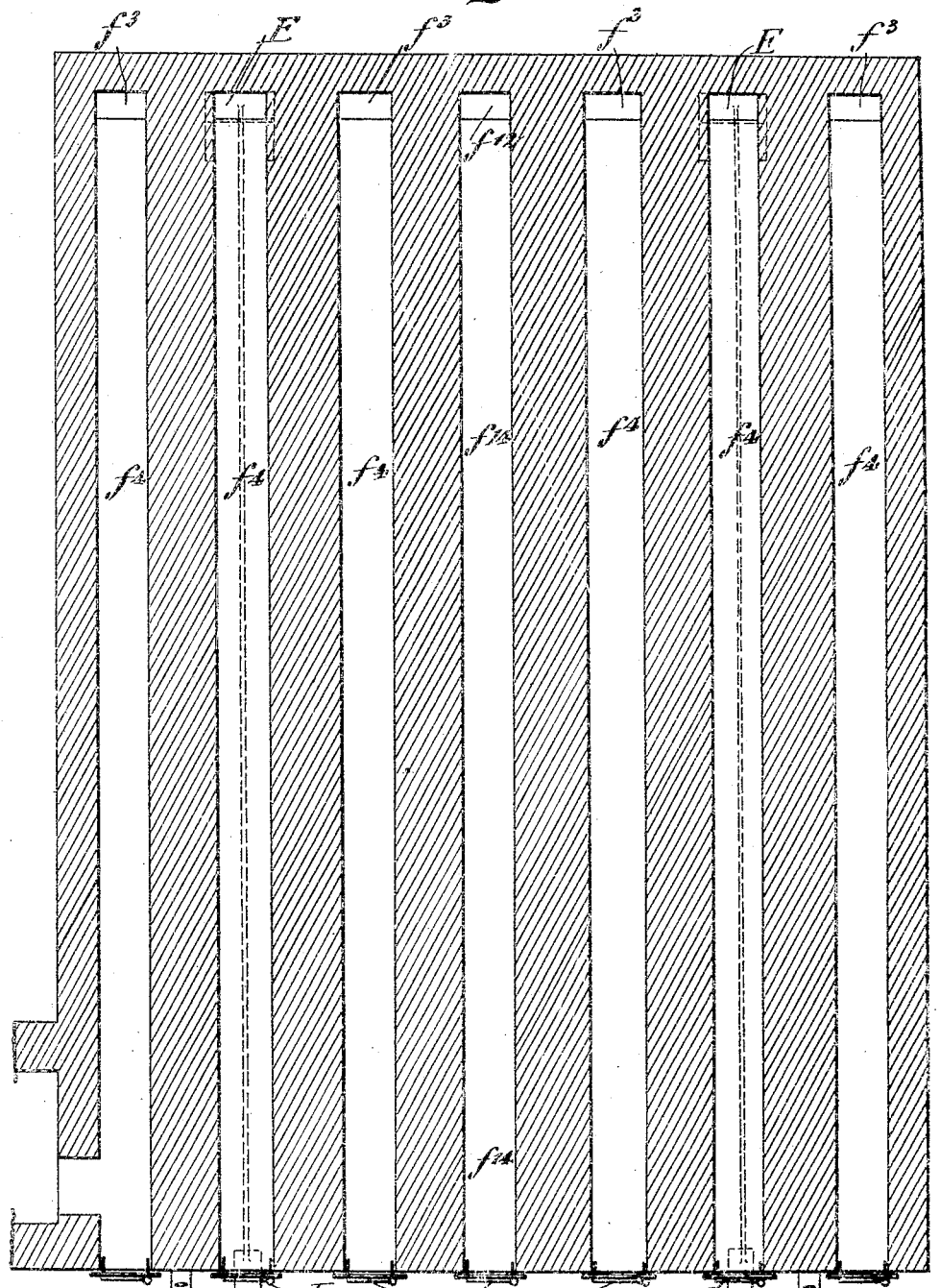

No. 786,615.

Patented April 4, 1905.

UNITED STATES PATENT OFFICE.

BAPTISTE YCRE, OF NEW YORK, N. Y.

BAKER'S OVEN.

SPECIFICATION forming part of Letters Patent No. 786,615, dated April 4, 1905.

Application filed September 2, 1904. Serial No. 223,124.

*To all whom it may concern:*

Be it known that I, BAPTISTE YCRE, a citizen of the United States, residing in New York, borough of Manhattan, and State of New York, have invented certain new and useful Improvements in Bakers' Ovens, of which the following is a specification.

This invention relates to certain improvements in bakers' ovens, and more especially to the arrangement of the flues for heating up the oven preparatory to baking and to the heating-flues for heating the baking-chamber after the batch is inserted in the same, the flues being arranged below, sidewise, and above the baking-chamber and connected by a transverse top flue with the chimney in such a manner that in connection with a proper arrangement of dampers the heat of the oven can be regulated as required for the batch in the baking-chamber and by means of which the effective heating of the oven is secured; and for this purpose the invention consists of a baker's oven in which the baking-chamber is heated by means of horizontal flues located below the sole-plate and above the arch of the baking-chamber, side flues located in the side walls of the oven for conducting the heating-gases to the rear wall of the oven, vertical flues in the rear wall, and a transverse top flue connected by short flues with the horizontal flues above the baking-chamber and connecting them with the chimney.

The invention consists, further, of the arrangement of auxiliary fireplaces for "firing" the baking-chamber to proper heat, a center flue for conducting the hot gases through the baking-chamber and through a vertical flue in the rear wall and through the transverse top flue.

The invention consists, further, of a baker's oven in which the baking-chamber is kept at the desired degree of heat after it is fired by a number of bottom, side, and top flues connected by vertical rear flues with each other and by vertical front flues with the horizontal top flues leading to the chimney, so that in connection with suitable dampers the heating up of the baking-chamber can be fully controlled; and the invention consists, lastly, of certain details of construction which will be fully described hereinafter and finally pointed out in the claims.

Figure 1:
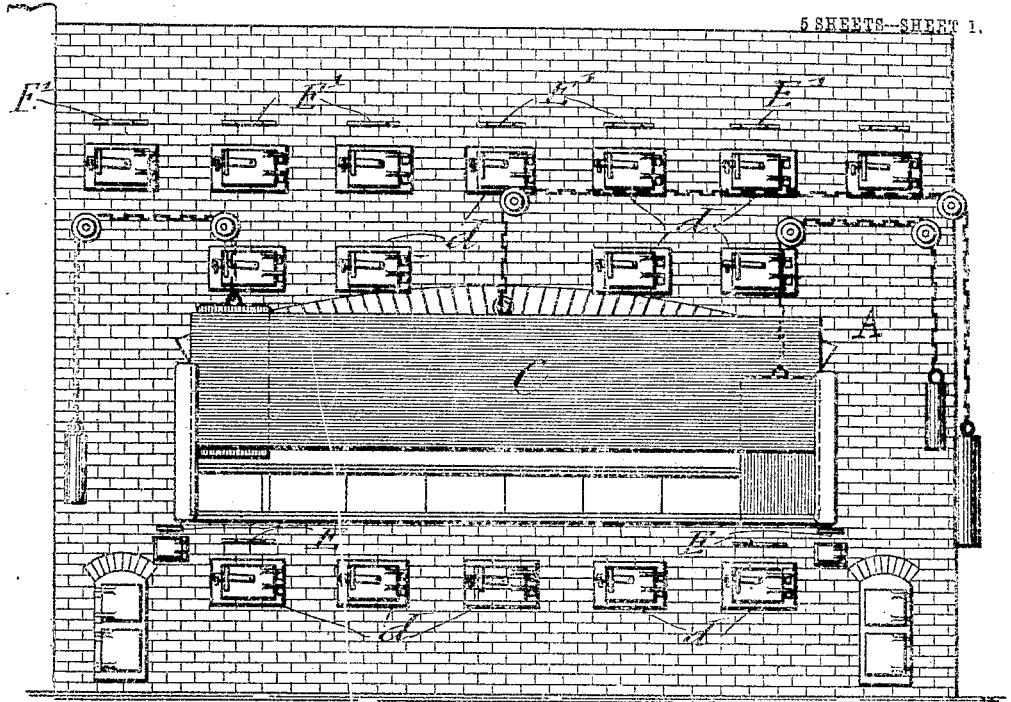
Figure 2:
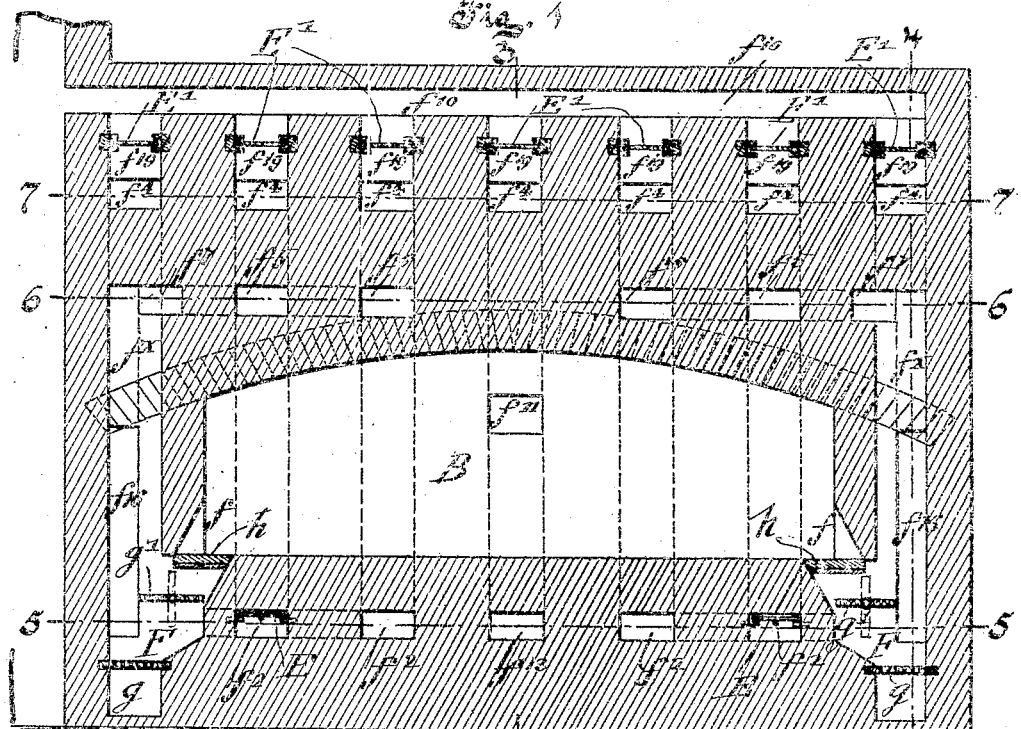
Figure 3:
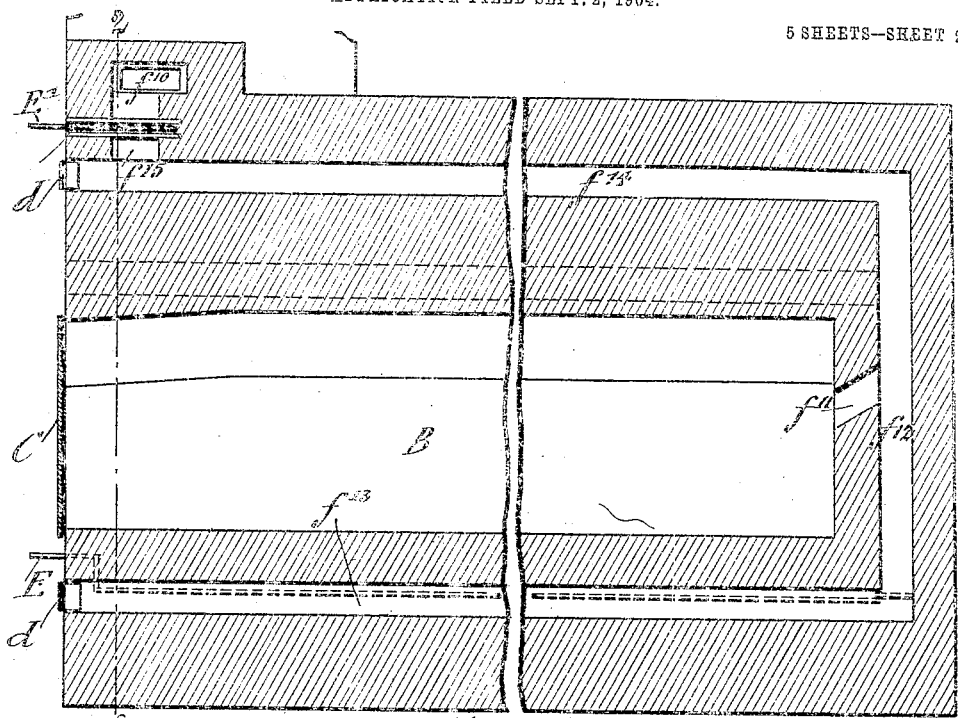
Figure 4:
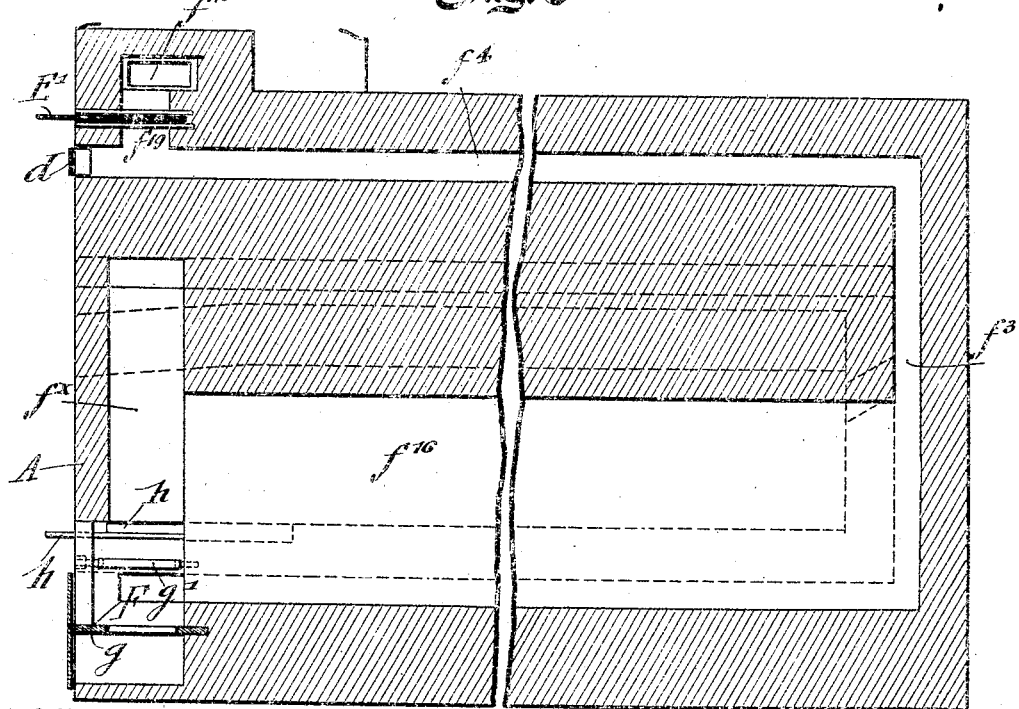

In the accompanying drawings, Figure 1 is a front elevation of my improved baker's oven. Fig. 2 is a vertical transverse section of the same on line 2 2, Fig. 3. Figs. 3 and 4 are vertical longitudinal sections, respectively, on lines 3 3 and 4 4, Fig. 2; and Figs. 5, 6, and 7 are horizontal sections on lines 5 5, 6 6, and 7 7, Fig. 2.

Similar letters of reference indicate corresponding parts.

Referring to the drawings, A designates the front wall of my improved bakers' oven. In the front wall is arranged the opening for the arched baking-chamber B, which is closed by a main gate C and auxiliary side gates and laterally-shiftable blocks between the same, said main gate and auxiliary gates being guided in suitable ways of the frame of the gate, as described in the prior patent heretofore granted to me, No. 762,466, dated June 14, 1904. The main and auxiliary gates are counterbalanced by weighted chains guided in suitable pulleys supported on the front wall of the oven, as shown in Fig. 1. The oven is heated by means of fireplaces F, which are arranged in the front wall of the oven near the lower corners thereof, said fireplaces being connected by upwardly-inclined flues $f$ with the baking-chamber B, as shown in Fig. 2, and by obliquely-extending horizontal flues $f'$ with horizontal parallel flues $f^2$, located below the sole-plate of the oven, as shown in Fig. 5. These flues $f^2$ communicate with a number of vertical flues $f^3$ in the rear wall of the oven, and said flues in turn are in communication with horizontal flues $f^4$ in the upper part of the oven, as shown in Fig. 7. The fireplaces F are also connected by vertical front flues $f^x$ and obliquely-extending horizontal flues $f^7$ with two pairs of horizontal flues $f^5$ $f^6$, which are located above the arch of the baking-chamber, as shown in Fig. 6, the rear ends of the flues $f^6$ being connected by obliquely-extending horizontal flues $f^9$ with the rear ends of the flues $f^5$, each pair of flues being thus in communication with one of the vertical rear flues $f^3$. Horizontal side flues $f^{10}$ also connect the furnaces F with the end rear flues $f^3$, which taper upwardly, as will be seen from a comparison of Figs. 5, 6, and 7, the side flues $f^{16}$ being of less width than the top flues $f^4$. The upper ends of all the vertical rear flues $f^3$ are connected with the horizontal draft-flues $f^4$, which extend in forward direction toward the front wall and are closed, like the flues immediately above and below the baking-chamber, by doors $d$, for permitting the removal of ashes and other sediments, which are brushed or scraped backwardly into the vertical rear flues and then drawn forward through the different bottom flues. These horizontal draft-flues are also connected at their front ends by short vertical flues $f^{19}$ with a horizontal transverse draft-flue $f^{10}$, located in the upper part of the front wall of the oven, as shown in Figs. 2, 3, and 4, by which the connection with the chimney is made.

Regulating-dampers E are arranged at the rear end of the lower horizontal flues, the damper-rods extending through said flues to the opening in the front wall, so as to be operated from the front end when the upper horizontal flues are to be cleaned. An additional set of dampers E' is located above the horizontal top flues in the short vertical flues leading to the transverse main flue $f^{10}$, so as to shut off any one of the vertical connecting main flues, as required for the proper heating of the oven.

In the upwardly-inclined flues $f$ of the fireplaces are arranged horizontal tile-covered dampers $h$, which are drawn forward into the front wall when the baking-chamber is to be fired—that is to say, heated up preparatory to the baking operation. Below said tile-covered dampers $h$ are arranged dumping-grates $g'$, on which the fires for firing the baking-chamber are made, the fuel on the grates being dumped on the grates $g$ of the main fireplaces F, when the heating up of the baking-chamber is completed. Any suitable known means for dumping the grates may be used. After the fire on the dumping-grates is dumped onto the grates of the main fireplaces the tile-covered dampers $h$ are placed in position so as to close the upwardly-inclined side flues $f$ of the main fireplaces and close the baking-chamber toward the same.

The baking-chamber is provided in its rear wall with an upwardly-inclined flue $f^{11}$, (shown clearly in Figs. 2 and 3,) which connects with a vertical central flue $f^{12}$, disposed intermediately of and parallel to the vertical rear flues $f^3$. The flue $f^{12}$ is connected at its lower end with a horizontal cleaning-flue $f^{13}$, intermediate of the flues $f^2$ below the sole-plate, and at its upper end with a horizontal draft-flue $f^{14}$, that is connected with a short vertical flue $f^{15}$, provided with a damper E' in the same manner as the other flues, with the transverse main flue $f^{10}$ leading to the chimney.

When the baking-chamber has been fired by the fires of the auxiliary fireplaces—that is to say, when the same is heated up sufficiently for receiving the so-called "batch" of articles to be baked—the auxiliary fires are dumped, the tile-covered dampers $h$ are placed in position so as to close off the baking-chamber from the main fireplaces, and the upper damper of the draft-flue closed, whereby the interior of the baking-chamber is cut off from direct connection with the chimney. All the dampers of the remaining vertical front flues are then opened, so that the hot gases from the main fireplaces F are drawn through the horizontal flues $f^2$ below the baking-chamber, the horizontal flues $f^5 f^6$ above the arch of the baking-chamber, upwardly through the rear flues $f^3$, from the same to the upper rows of horizontal flues $f^4$ in forward direction, and through the short vertical front flues $f^{19}$ to the transverse main flues $f^{10}$ and the chimney. The hot gases are also drawn through the flues $f^{16}$ of the side walls of the oven to the rear flues $f^3$, from the same to the horizontal top flues $f^4$, and through the short vertical flues $f^{19}$ to the main transverse flue $f^{10}$ and to the chimney. In this manner the heating of the baking-chamber is kept up uniformly and regularly, the damper arrangement permitting full control of the heating-flues, and thereby the regular and continuous heating of the oven and the uniform baking of the articles in the same.

The advantages of my improved system of heating-flues for bakers' ovens are, first, that after the arched baking-chamber is fired the same can be kept at uniform heat for the baking operation by means of the bottom flues, side flues, rear, top and front flues, by which the heat of the hot products of combustion is completely given up for heating up of the walls surrounding the baking-chamber, the heat being controlled by the dampers in the vertical front flues; second, that by the accessiblity of the horizontal flues through the openings in the front wall of the oven all the flues can be readily cleaned into the vertical rear flues; third, that a full control of the heating operation of the oven is obtained by the separation of the firing heat for the baking-chamber from the continuous heat required for the baking operation; fourth, the compact and convenient arrangement of the flues by which they are all readily accessible around the bottom, sides, and top of the baking-chamber, by which the same can be built up in convenient manner.

Having thus described my invention, I claim as new and desire to secure by Letters Patent—

1. In a baker's oven, the combination, with a baking-chamber, of main fireplaces arranged in the front wall thereof, flues leading from said fireplaces to said baking-chamber, means for permitting the escape of the hot gases from the latter, auxiliary fireplaces in said flues for assisting in the preliminary heating of the baking-chamber, means for closing said flues and thereby cutting off communication between the main and auxiliary fireplaces and the baking-chamber, and flues in communication with the main fireplaces for exteriorly heating the baking-chamber.

2. In a baker's oven, the combination with a baking-chamber, of main fireplaces for heating the same, flues leading from same fireplaces to said baking-chamber, means for permitting the escape of the hot gases from the latter, auxiliary fireplaces in said flues and comprising dumping-grates, means for closing said flues and thereby cutting off communication between the main and auxiliary fireplaces and baking-chamber, and flues in communication with the main fireplaces exteriorly heating the baking-chamber.

3. In a baker's oven, the combination, with a baking-chamber, of main fireplaces arranged in the front wall thereof, flues leading from said fireplaces to the baking-chamber, means for permitting the escape of the hot gases from the latter, auxiliary fireplaces arranged in said flues and comprising dumping-grates, said dumping-grates being so arranged that when the fire thereon is dumped the same will fall upon the grates of the main fireplaces, means for closing said flues and thereby cutting off communication between the main and auxiliary fireplaces and the baking-chamber, and flues in communication with the main fireplaces for heating the exterior of the baking-chamber.

In testimony that I claim the foregoing as my invention I have signed my name in presence of two subscribing witnesses.

BAPTISTE YCRE.

Witnesses:
 PAUL GOEPEL,
 HENRY J. SUHRBIER.